United States Patent [19]

Yoshimura et al.

[11] Patent Number: 4,688,192

[45] Date of Patent: Aug. 18, 1987

[54] ELECTRONIC DICTIONARY

[75] Inventors: Motokazu Yoshimura; Koichi Hirata, both of Nagoya; Kimie Kurebayashi, Hiratsuka, all of Japan

[73] Assignee: Brother Kogyo Kabushiki Kaisha, Aichi, Japan

[21] Appl. No.: 625,392

[22] Filed: Jun. 28, 1984

[30] Foreign Application Priority Data

Jun. 28, 1983 [JP] Japan ............................. 58-116562

[51] Int. Cl.⁴ ...................... G06F 15/02; G06F 15/38
[52] U.S. Cl. ..................................... 364/900; 364/419
[58] Field of Search ... 364/200 MS File, 900 MS File, 364/419, 300, 706, 705, 709; 434/157; 340/798, 711

[56] References Cited

U.S. PATENT DOCUMENTS

| | | | |
|---|---|---|---|
| 4,158,236 | 6/1979 | Levy | 364/900 |
| 4,218,760 | 8/1980 | Levy | 364/900 |
| 4,339,806 | 7/1982 | Yoshida | 364/900 |
| 4,384,329 | 5/1983 | Rosenbaum et al. | 364/300 |
| 4,438,505 | 3/1984 | Yanagiuchi et al. | 364/900 |
| 4,481,607 | 11/1984 | Kolayashi et al. | 364/900 |

*Primary Examiner*—Eddie P. Chan
*Attorney, Agent, or Firm*—Browdy and Neimark

[57] ABSTRACT

An electronic dictionary comprising a dictionary memory which has multiple data memory locations identified by respective addresses. Each data memory location comprises a word-data memory location for storing a word, and an address-number memory location for storing one of the addresses at which is stored a word synonymous with or antonymous to the word stored in the corresponding word-data memory location. Upon entry of a word through an input device, the word in the dictionary memory is retrieved from the stored in the respective word-data memory location, and the address-number data in the corresponding address-number memory location is read out to search the data memory location which is designated by the read-out address-number data. The word stored in the word-data memory location of the searched data memory location is displayed as a synonym or antonym of the word which has been entered through the input device. The word-data memory locations may be grouped into two vocabulary storage parts corresponding to two languages. In this arrangement, the dictionary may be used to know the meaning of a word of one language, via words of the other language whose data memory locations are designated by the address-number data stored in the data memory locations for the above one language.

14 Claims, 10 Drawing Figures

ELECTRONIC DICTIONARY

BACKGROUND OF THE INVENTION

The present invention relates to an electronic dictionary device which is capable of displaying one or more synonyms of a word which is entered through suitable input means such as keys corresponding to letters of a language.

An electronic dictionary is known, which uses a dictionary memory M as shown in FIG. 8. The dictionary memory stores vocabulary data which consists of a multiplicity of word data representative of words of a language. As shown in FIG. 8, the vocabulary data are stored in a vocabulary storage section 1 which comprises many word-data memory locations at which the respective word data are stored. Corresponding to the word-data memory locations, there are provided synonym-data memory locations which constitute a synonym-data storage section 2. In each of the synonym-data memory locations, there is stored at least one synonym data which represents a synonym of a word stored in the corresponding word-data memory location. The word-data memory location and the synonym-data memory location constitute a data memory location. Thus, the dictionary memory M which consists of the vocabulary storage section 1 and the synonym-data storage section 2, comprises multiple data memory locations identified by respective addresses which correspond to multiple different words and multiple sets of synonyms of these different words.

For example, as shown in FIG. 9, word-data representing a word "CONSIDER" is stored in the word-data memory location 1' of the first data memory location. In the corresponding synonym-data memory location 2', there are stored synonym-data which represent synonyms of the word "CONSIDER", such as "THINK", "REFLECT", and "DELIBERATE". Accordingly, each of such synonym-data memory location 2' uses a larger memory area than the corresponding word-data memory location 1' which stores the word data for a single word. Therefore, the synonym-data storage section 2 is required to have a relatively larger memory capacity, which leads to increased memory capacity requirement of the dictionary memory M.

SUMMARY OF THE INVENTION

It is accordingly an object of the present invention to provide an electronic dictionary which is operable with a dictionary memory of a relatively small memory capacity.

Another object of the invention is to provide such an electronic dictionary which is capable of easily indicating a synonym or synonyms of a word which is entered through an input device.

According to the invention, there is provided an electronic dictionary, comprising: (a) an input device having a multiplicity of character keys and a call key; (b) a dictionary memory having a multiplicity of data memory locations identified by respective addresses, each of the data memory locations comprising a word-data memory location and an address-number memory location corresponding to each other, the word-data memory location storing word data representative of a word, the address-number memory location storing address-number data representative of one of the addresses at which is stored a word synonymous with the word stored in the word-data memory location corresponding to said address-number memory location, the word-data memory locations constituting a vocabulary storage section, and the address-number memory locations constituting a synonym-address storage section; (c) a working member for storing character data entered through the character keys; (d) search means for searching, upon activation of said call key, one of the word-data memory locations at which a word represented by said character data is stored; (e) first retrieval means for retrieving the address-number data stored in the address-number memory location which corresponds to the word-data memory location searched by the search means; (f) second retrieval means for retrieving the word data stored in one of the word-data memory locations which is designated by the address-number data retrieved by the first retrieval means; and (g) display means for indicating a word represented by the word data retrieved by the second retrieval means, as a synonym of the word represented by the character data entered through the character keys.

In the electronic dictionary constructed as described above, a data memory location at which a synonym of a given word is stored, is designated by address-number data stored in another data memory location at which said given word is stored. The address-number memory location of each data memory location stores only one address-number data which represents the address of the data memory location at which a synonym of the word stored in said each data memory location is stored. The synonym of a keyed-in word is displayed when the call key is operated after the word has been entered through the character keys. According to the invention, the address-number memory location of the data memory location storing the displayed synonym also stores address-number data which designates the data memory location at which a synonym of the displayed synonym is stored. It is easily understood that this latter synonym is also a synonym of the originally keyed-in word. Thus, a chain of synonyms of the keyed-in word are displayed in succession by repeatedly pressing the call key. The arrangement according to the invention will require a reduced memory capacity of the synonym-address storage section, because each address-number memory location stores address-number data for only one address. This arrangement is contrary to a known arrangement wherein each data memory location stores not only a set of word data representative of a word, but also plural sets of synonym data representative of synonyms of the word.

According to one advantageous embodiment of the invention, the vocabulary storage section stores multiple synonym groups of words which are synonymous with each other. Each one of the address-number memory locations corresponding to the word-data memory locations storing the words belonging to one of the synonym groups, stores the address-number data which represents only one of the multiple addresses that is not represented by the address-number data stored in the other address-number memory locations associated with said one of the synonym groups. In this embodiment, the words synonymous with each other of each synonym group are connected together in a closed loop wherein the synonymous words are followed by each other in succession. In other words, synonyms of a keyed-in word may be displayed until the keyed-in word is displayed as one member of a synonym group, by repeatedly operating the call key.

According to an alternative embodiment of the invention wherein the vocabulary storage section stores multiple synonym groups as in the above embodiment, each of the address-number memory locations consists of a first and a second address-number memory location. Each one of the first address-number memory locations which correspond to the word-data memory locations at which the synonymous words of one synonym group are stored, stores the address-number data which represents only one of the multiple addresses associated with the one synonym group, so that the synonymous words of that synonym group are searched in one direction with the address-number data. The first address-number memory location which corresponds to the synonymous word last searched in said one direction stores a forward end data representing an end of search in said one direction. Each one of the second address-number memory locations which correspond to the word-data memory locations at which the synonymous words of said one synonym group are stored, stores the address-number data which represents only one of the multiple addresses associated with said one synonym group, so that the synonymous words of that synonym group are searched, in another direction opposite to said one direction, with the address-number data. The second address-number memory location which corresponds to the synonymous word last searched in said another direction stores a backward end data representing an end of search in said another direction. When the first retrieval means retrieves the forward end data during search by the search means in said one direction, the first retrieval means retrieves the address-number data stored in the second address-number memory location corresponding to the first address-number memory location storing the forward end data.

In the above alternative arrangement, each data memory location stores only two sets of address-number data, and is therefore required to have a relatively small memory capacity.

According to a modified form of the above alternative embodiment, when the call key is activated for the first time after entry of a word through the character keys, the working memory stores the address-number data in the second address-number memory location which corresponds to the word-data memory location searched by the search means. When the first retrieval means retrieves the forward end data during search by the search means in said first direction, the first retrieval means retrieves the address-number data which has been stored in the working memory upon the first activation of the call key. This modified arrangement is advantageous in that each of member words of a keyed-in word is displayed only once before all of the member words are displayed.

According to another aspect of the invention, there is provided a typewriter which includes an electronic dictionary as described above, and a printing device. In this typewriter, the input device of the electronic dictionary further includes a space bar, and is used as a keyboard. The printing device prints the previously discussed synonym when the synonym is displayed on the display means upon activation of the space bar. When the synonym is not displayed upon activation of the space bar, the printing device prints the word which has been entered through the character keys. This arrangement according to the invention is very useful when the operator of the typewriter has an idea or meaning to express but can not think of a satisfactory word for it. In such an instance, the operator thinks of a word whose meaning is related to the meaning which the operator is aiming at. Then, the operator keys in that word, and the display means indicates a chain of synonyms of that keyed-in word successively upon depression of the call key. When the operator hits the synonymous word that the operator is looking for, the space bar is depressed, and the displayed word (synonym of the keyed-in word) is printed.

According to a further aspect of the invention, there is provided an electronic dictionary, comprising:

an input device having a multiplicity of character keys and a call key;

a dictionary memory having a multiplicity of data memory locations identified by respective addresses, each of said data memory locations comprising a word-data memory location and an address-number memory location corresponding to each other, said word-data memory location storing word data representative of a word, said address-number memory location storing address-number data representative of one of said addresses at which is stored a word associated with the word stored in the word-data memory location corresponding to said address-number memory location, the word-data memory locations of said multiplicity of data memory locations constituting a vocabulary storage section, and the address-number memory locations constituting a related-address storage section;

a working memory for storing character data entered through said character keys;

search means for searching, upon activation of said call key, one of said word-data memory locations at which a word represented by said character data is stored;

first retrieval means for retrieving the address-number data stored in the address-number memory location which corresponds to the word-data memory location searched by said search means;

second retrieval means for retrieving the word data stored in one of said word-data memory locations which is designated by the address-number data retrieved by said first retrieval means; and display means for indicating a word represented by the word data retrieved by said second retrieval means, as a word associated with said word represented by said character data entered through said character keys.

In one form of the above aspect of the invention, the vocabulary storage section is divided into two parts. Each of the word-data memory locations in one of the two parts of the vocabulary storage section stores word data which represents a word of one language, while each of the word-data memory locations in the other part of the vocabulary storage section stores word data which represents a word of another language. The address-number data in each of the address-number memory locations which correspond to the word-data memory locations in said one part of the vocabulary storage section stores address-number data representing one of the addresses of the word-data memory locations in said other part of the vocabulary storage section at which is stored a word equivalent in meaning to the word stored in the word-data memory location corresponding to said each address-number memory location. In this modified form of the invention, the electronic dictionary may be used to know the meaning of a word of one language, via words of the other language whose word-data memory locations are designated by the address-number data stored in the address-number memory locations corresponding to the word-data memory locations in said one part of the vocabulary storage section. Thus, the electronic dictionary may be used, for example, as an English-Japanese or an English-Japanese/-Jananese-English dictionary.

In an alternative form of the above aspect of the invention, the address-number data in each of the address-number memory locations represents one of the addresses at which is stored a word antonymous to the word stored in the word-data memory location corresponding to said each address-number memory location.

BRIEF DESCRIPTION OF THE DRAWING

The above and other objects, features and advantages of the present invention will become more apparent from reading the following description of the preferred embodiments taken in connection with the accompanying drawing in which.

DETAILED DESCRIPTION OF THE PREFERRED EMBODIMENTS

Figures 1, 2:
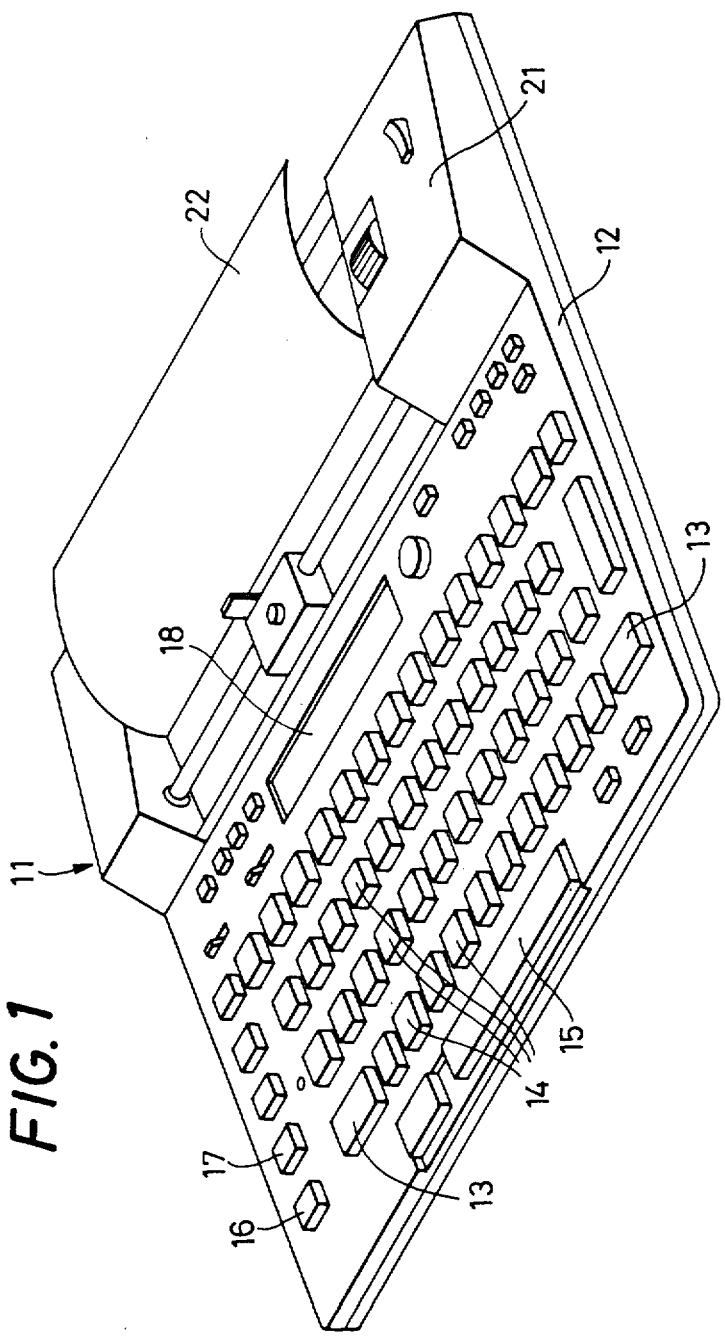
FIG. 1 is a perspective view of an electronically operated typewriter equipped with one embodiment of an electronic dictionary of the invention.
FIG. 2 is an illustration of a display provided on the typewriter of FIG. 1, showing an example of indication on the display.

Referring to the accompanying drawing, there is shown in FIG. 1 an electronic typewriter generally indicated at 11, which is equipped with an electronic dictionary of the invention. The typewriter 11 includes an input device in the form of an input keyboard 12 which has a right and a left shift key 13, 13, a multiplicity of character keys 14 corresponding to alphabetic letters, numerals and symbols, and a space bar 15. Desired data such as letters (words) and digits (numerical values) are entered through the character keys 14.

To the left of the left shift key 13, there are disposed a synonym-call key 16 and a clear key 17. The synonym-call key 16 is operated when it is desired to find a word or words which is/are synonymous with or allied in meaning to the meaning of a word (e.g., English word) which is entered through the character keys 14. The clear key 17 is operated when it is desired to cancel an already keyed-in word and enter a new word, more precisely, to replace the already keyed-in characters (not necessarily a word) with a new set of characters, which usually form a word. In a rear central portion of the keyboard 12 is provided display means in the form of a display 18 which is adapted to indicate data keyed in through the character keys 14, for example a word 19 ("CONSIDER") as shown in FIG. 2, and also a synonym 20 ("THINK") of the keyed-in word 19 (a word 20 synonymous with or related in meaning to the keyed-in word 19). Behind the keyboard 12, there is disposed a printing device 21 which is capable of effecting a printing operation on a sheet of paper 22, upon activation of the space bar 15, according to character data which have been entered through the character keys 14 prior to the activation of the space bar 15.

Figure 3:
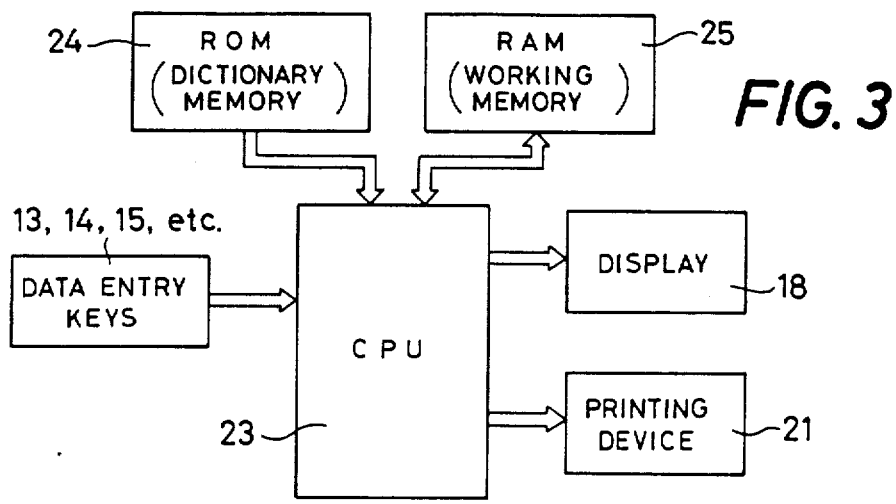
FIG. 3 is a schematic block diagram of an electric control system of the typewriter.
Figure 4:
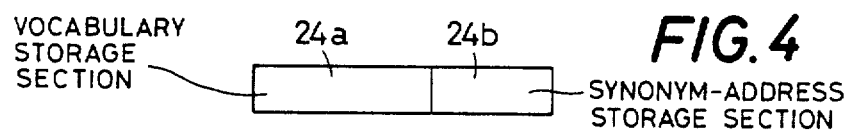
FIG. 4 is a view showing storage sections of a dictionary memory used in the electronic dictionary.
Figure 5:
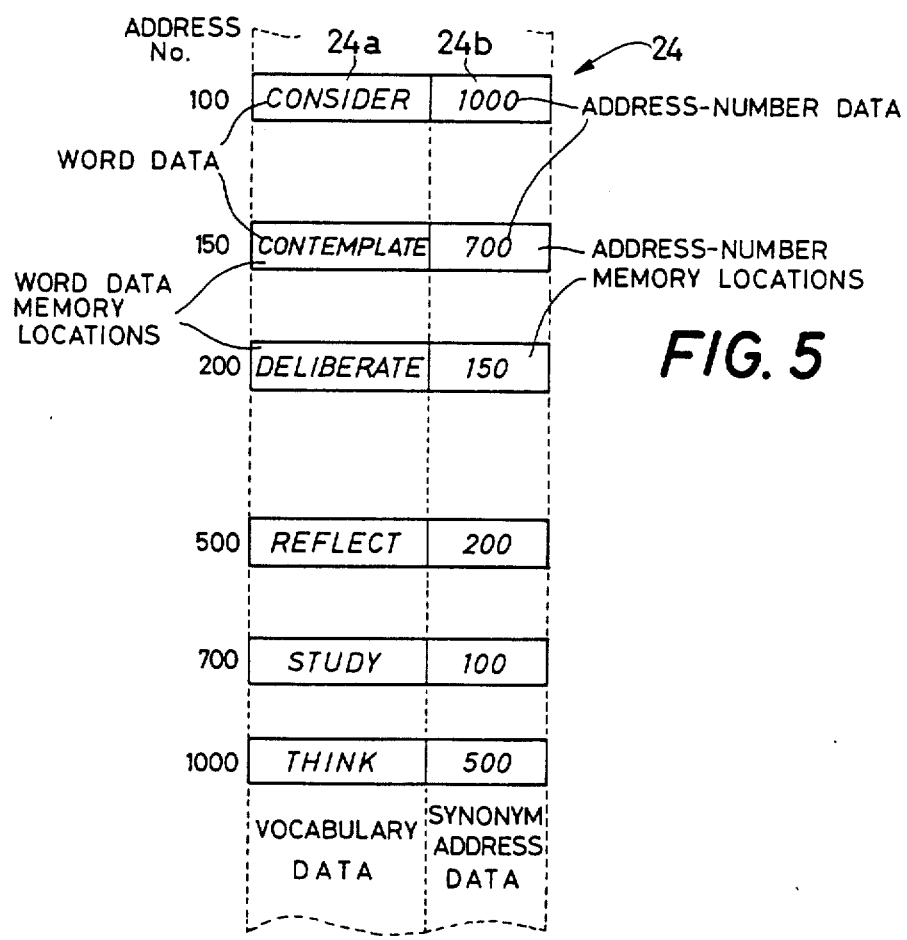
FIG. 5 is a diagrammatic illustration showing several data memory locations of the dictionary memory, and an example of contents of the memory locations.

Referring next to FIGS. 3, 4 and 5, there will be described an arrangement of an electric control system of the electronic dictionary incorporated in the typewriter 11 constructed as stated above.

The control system comprises a central processing unit 23 (hereinafter simply called "CPU 23") which includes search and retrieval means. Upon activation of the character keys 14, space bar 15, synonym-call key 16, and other keys on the keyboard 12, the corresponding input signals are transferred to the CPU 23, which responds to these input signals to operate the display 18 and the printing device 21 for indicating the keyed-in words on the display 18 and printing them on the sheet of paper 22.

The CPU 23 is connected to a dictionary memory in the form of a read-only-memory ROM 24 (hereinafter referred to as "ROM 24") which comprises a multiplicity of data memory locations identified by respective numbered addresses as shown in FIG. 5. Each of the data memory locations consists of a word-data memory location 24a, and an address-number memory location 24b, as shown in FIG. 5. In the word-data memory location 24a, there is stored a set of word data which represents a word 19. Thus, the word-data memory locations 24a of the multiple data memory locations constitute a vocabulary storage section as indicated in FIG. 4 in which multiple different words are stored in an alphabetical order as indicated in FIG. 5.

The address-number memory location 24b of each data memory location stores a set of address-number data which designates or represents one of the addresses at which is stored a word synonymous with or related in meaning to the word stored in the corresponding word-data memory location 24a. The address-number memory locations 24b of the multiple data memory locations constitute a synonym-address storage section as indicated in FIG. 4, which cooperates with the vocabulary storage section to form the dictionary memory 24 (ROM 24).

Stated more particularly, the vocabulary storage section stores multiple groups of words which are synonymous with each other. For example, as shown in FIG. 5, a synonym group consists of six different English words: "CONSIDER", "CONTEMPLATE", "DELIBERATE", "REFLECT", "STUDY" and "THINK" which are stored in the word-data memory locations 24a at address Nos. 100, 150, 200, 500, 700 and 1000. In the address-number memory location 24b corresponding to the word-data memory location 24b at address No. 100 (at which the word data "CONSIDER" is stored), there is stored address-number data "1000" which represents address No. 1000 at which the word data "THINK" is stored. This means that the word "THINK" is selected as one member of the synonym group, a synonym of the word "CONSIDER". Similarly, address-number data "500", "200", "150" and "700" are stored in the address-number memory locations 24b at address Nos. 1000, 500, 200 and 150, respectively, so as to designate other members of the synonym group; "REFLECT", "DELIBERATE", "CONTEMPLATE" and "STUDY". Further, in the address-number memory location 24b at address No. 700, address-number data "100" is stored so that the word "CONSIDER" at address No. 100 is designated as a word synonymous with the word "STUDY". In this way, the six words "CONSIDER", "THINK", "REFLECT", "DELIBERATE", "CONTEMPLATE" and "STUDY" which forms a synonym group are connected together in a closed loop wherein the member words are followed by each other in succession, irrespective of the member word which is entered through the character keys 14. These member words of the synonym group are indicated on the display 18 under control of the CPU 23 in a manner as discussed later.

The CPU 23 is further connected to a working memory in the form of a random-access-memory RAM 25 (hereinafter referred to as "RAM 25") which stores character data entered through the character keys 14, and word data and address-number data which are retrieved by the CPU 23 from the ROM 24.

Figure 6A:
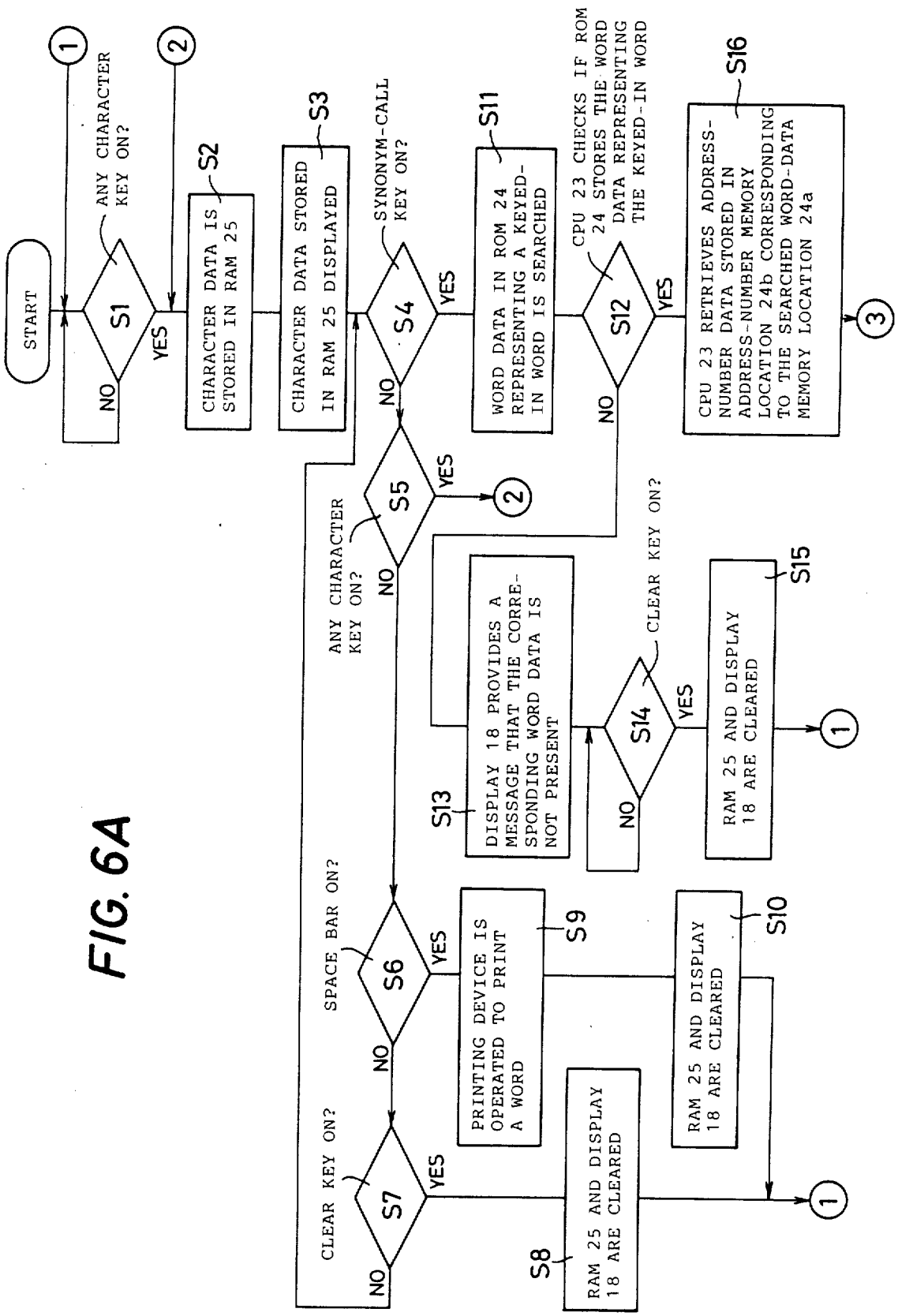
FIG. 6 is a diagrammatic flow chart showing events of operation controlled by a central processing unit of the control system.
Figure 6B:
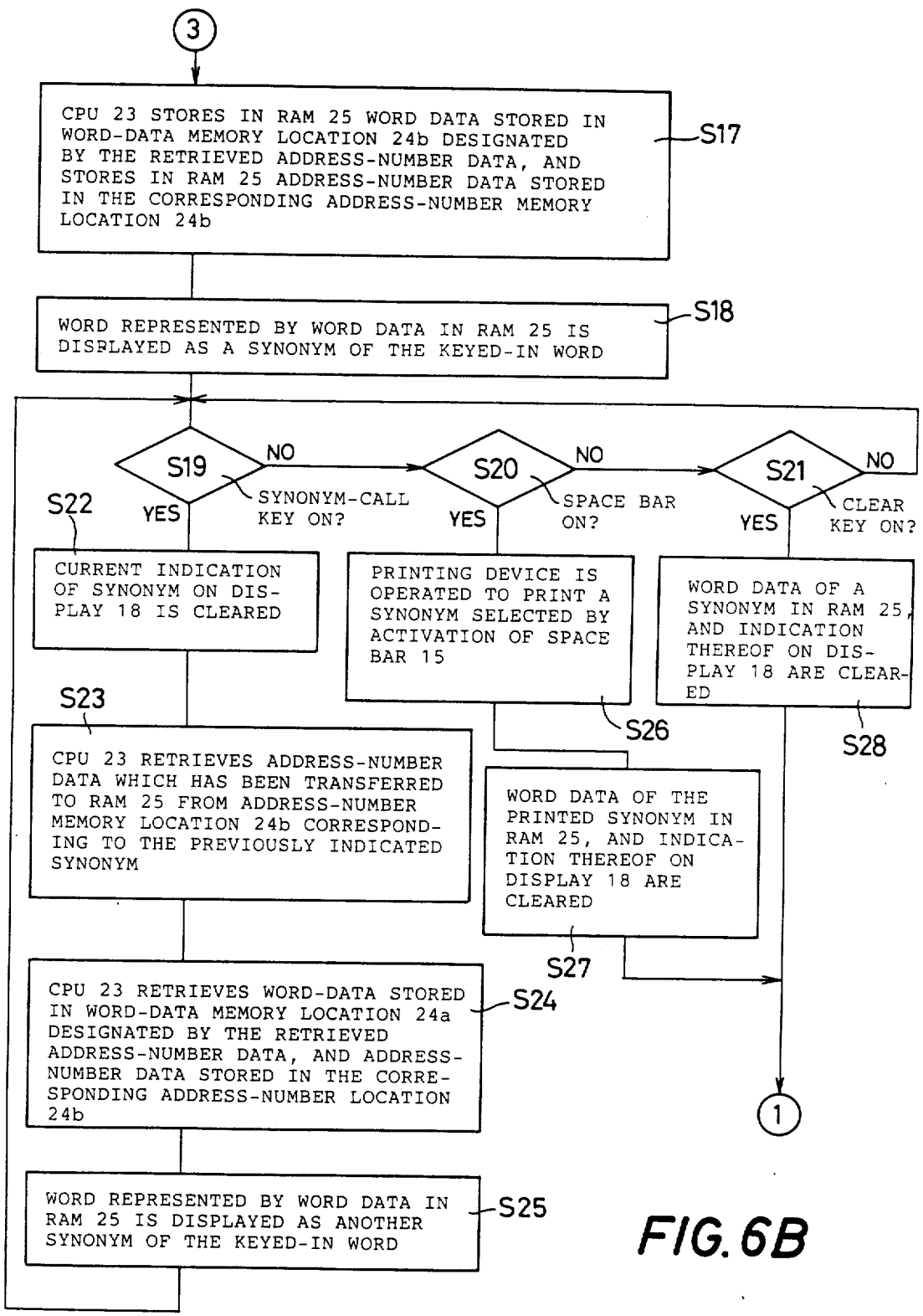

The operation of the electronic dictionary of the typewriter 11 with the above arrangement will be described referring to a flow chart of FIG. 6 which shows events of operations controlled by the CPU 23. For easy understanding, step numbers (numbers followed by letter S) to show the sequence of operation are given in FIG. 6 and inserted in parenthesis in the following description.

After application of power to the typewriter 11, the CPU 23 are ready to accept input data which are entered through the keyboard 12, i.e., ready to accept character data which is entered through the character keys 16 (S1). If the operator desires to enter a word "CONSIDER", the character key 14 corresponding to letter "C" is first pressed. The CPU 23 transfers the character data "C" into the RAM 25 (S2), and directs the display 18 to indicate the character "C" based on the character data "C" stored in the RAM 25 (S3).

Then, the CPU 23 checks to see if the synonym-call key 16, any character key 14, space bar 15 or clear key 17 has been activated (S4–S7). When the operator depresses the character key 14 corresponding to letter "O" (S5), the CPU 23 goes to step S2 wherein the character data "O" is stored in the RAM 25. Successively, the character "O" is indicated to the right of the character "C" already indicated on the display 18 (S3). In the similar manner, the character keys 14 corresponding to the remaining letters "N", "S", "I", "D", "E" and "R" of the word "CONSIDER" are operated, and the corresponding character data are stored in the RAM 25. As a result, the word "CONSIDER" is indicated on the display 18.

If it is desired to change a word already entered through the character keys 14, or to correct a misspelled word, the clear key 17 is operated (S7). In this instance, the RAM 25 and the display 18 are cleared (S8), and the CPU 23 goes to step S1 and waits for entry of another or correct word. When the operator wants to print a word, for example, "CONSIDER" already entered through the character keys 14, the space bar 15 is operated (S6). Upon activation of the space bar 15, the CPU 23 operates the printing device 21 according to the character data stored in the RAM 25, whereby the word "CONSIDER" is printed (S9). Subsequently, the CPU 23 clears the RAM 25 and the display 18 (S10), and goes back to step S1 for entry of another word.

When the operator presses the synonym-call key 16 to find a synonym or synonyms of the word "CONSIDER" (S4), the CPU 23 initiates a searching operation in response to a signal from the synonym-call key 16, to find in the ROM 24 the word data which represents the word "CONSIDER" whose character data are stored in the RAM 25 (S11). In other words, the CPU 23 scans the word-data memory locations 24a to check if any one of the memory locations 24a stores the word data which represents a combination of eight letters "CONSIDER" (S12). In the event that the word data representing the word "CONSIDER" is not found in the ROM 24, the CPU 23 directs the display 18 to provides a message that the word data corresponding to the keyed-in word "CONSIDER" is not present in the ROM 24 (S13), and waits for the activation of the clear key 17 (S14). Upon activation of the clear key 17, the CPU 23 clears the RAM 25 and the display 18 (S15), and goes back to step S1.

When the word data representing the word "CONSIDER" has been searched in the ROM 24 (when the word-data memory location 24a storing the word data "CONSIDER" has been reached), the CPU 23 retrieves the address-number data stored in the address-number memory location 24b corresponding to the word-data memory location 24a at which the word data "CONSIDER" is stored (S16). In this specific example, the address-number data "1000" at address No. 100 is retrieved. Subsequently, the CPU 23 retrieves the word data "THINK" and the address-number data "500" stored in the word-data and address-number memory locations 24a and 24b at address No. 1000 which is represented by the retrieved address-number data "1000", and the CPU 23 stores these data "THINK" and "500" in the RAM 25 (S17). Based on the stored word data "THINK", the CPU 23 directs the display 18 to indicate the corresponding word "THINK" to the right of the already displayed word "CONSIDER" 19, to present the word "THINK" as a synonum 20 of the word "CONSIDER" (19), as shown in FIG. 2 (S18). Thus, the operator may know one of the synonyms of the word which has been keyed in through the input keyboard 12.

After the word "THINK" has been indicated on the display 18 as one of the synonyms 20 of the word "CONSIDER", the CPU 23 becomes ready to accept a signal from the synonym-call key 16, space bar 15 or clear key 17 (S19-S21). If the operator presses the synonym-call key 16 to try to find another synonym of the word "CONSIDER" (S19), the CPU 23 removes the current indication of the synonym 20, i.e., the word "THINK" from the display 18 (S22). (In this condition, the word "CONSIDER" remains indicated on the display 18.) Then, the CPU 23 retrieves the address-number data "500" which has previously been transferred to the RAM 25 from the address-number memory location 24b at address No. 1000 (S23). In the next step (S24), the CPU 23 retrieves the word-data, "REFLECT" stored in the word-data memory location 24a at address No. 500 designated by the retrieved address-number data "500", and also retrieves the address-number data "200" stored in the corresponding address-number memory location 24b at address No. 500. These data "REFLECT" and "200" are stored in the RAM 25 (S24). At this time, the word data "THINK" and the address-number data "500" previously stored in the RAM 25 are erased (S24).

Successively, the CPU 23 directs the display 18 to indicate the word "REFLECT" to the right of the word "CONSIDER", as a second synonym 20 of the keyed-in word "CONSIDER" 19 (S25). Then, the CPU 23 goes back to steps S19–S21 (becomes ready to accept a signal from the synonym-call key 16, space bar 15 or clear key 17).

With the following repeated activation of the synonym-call key 16, the third, fourth and fifth synonyms 20 of the word "CONSIDER" will be indicated on the display 18 according to the successively retrieved word data designated by the appropriate address-number data stored at the addresses at which those synonym word data are stored. That is, the words "DELIBERATE", "CONTEMPLATE and "STUDY" will be indicated according to the word data in the word-data memory locations 24a at address Nos. 200, 150, and 700 which are designated by the address-number data stored in the address-number memory locations 24b at address Nos. 500, 200 and 150, respectively. Upon a further operation of the synonym-call key 16 while the fifth synonym "STUDY" is displayed, the CPU 23 retrieves the word data "CONSIDER" according to the address-number data "100" stored in the address-number memory location 24b at address No. 700. Therefore, the word "CONSIDER" is indicated as a synonym of the keyed-in word "CONSIDER". This indicates the completion of one cycle of indication of synonyms of the keyed-in word "CONSIDER". If desired, this indication cycle may be carried out by repeatedly depressing the synonym-call key 16.

As discussed above, the operator can know plural synonyms of a keyed-in word by operating the synonym-call key 16 repeatedly. In other words, a group of synonyms of a given word, which is not a word satisfactory to the operator to express an idea, are displayed in succession by repeated operations of the synonym-call key 16. During this indication cycle, the operator may come across the right word which the operator is looking for. This synonym indicating capability of the electronic dictionary of the invention may be offered with a dictionary memory of a relatively small memory capacity, because each data memory location contains only one set of word data in its word-data memory location 24a, and only one set of address-number data in the address-number memory location 24b, as stated hitherto.

If the operator wishes to select and print the word "THINK" on the sheet 22 as the best word to express the meaning generally expressed by the keyed-in word "CONSIDER", the operator depresses the space bar 15 (S20), and the CPU 23 activates the printing device 21 to effect a printing operation according to the word data "THINK" currently stored in the RAM 25 (S26). Then, the word data "THINK" in the RAM 25 is cleared, and the indication of the word "THINK" on the display 18 is removed (S27). The CPU 23 then goes back to step S1, whereby the operator may continue a printing operation.

In the case where the operator wishes to enter a new word through the character keys 14, the clear key 17 is operated (S21). In this instance, the CPU 23 clears the word data stored in the RAM 25, and removes the current indication of a synonym on the display 18 (S28). Then, the CPU 23 goes back to step S1. Thus, the operator may enter a desired word for printing thereof or finding another word from among a group of synonyms of the keyed-in word.

While the word "CONSIDER" is keyed in through the character keys 14 in the above example of operation, the similar operation will take place when any of the member words of the synonym group is keyed in. For example, if the operator keys in the word "REFLECT" to know synonyms 20 thereof, its synonyms will be displayed in the order of "DELIBERATE", "CONTEMPLATE", "STUDY", "CONSIDER" and "THINK", by repeatedly depressing the synonym-call key 16.

Figure 7:
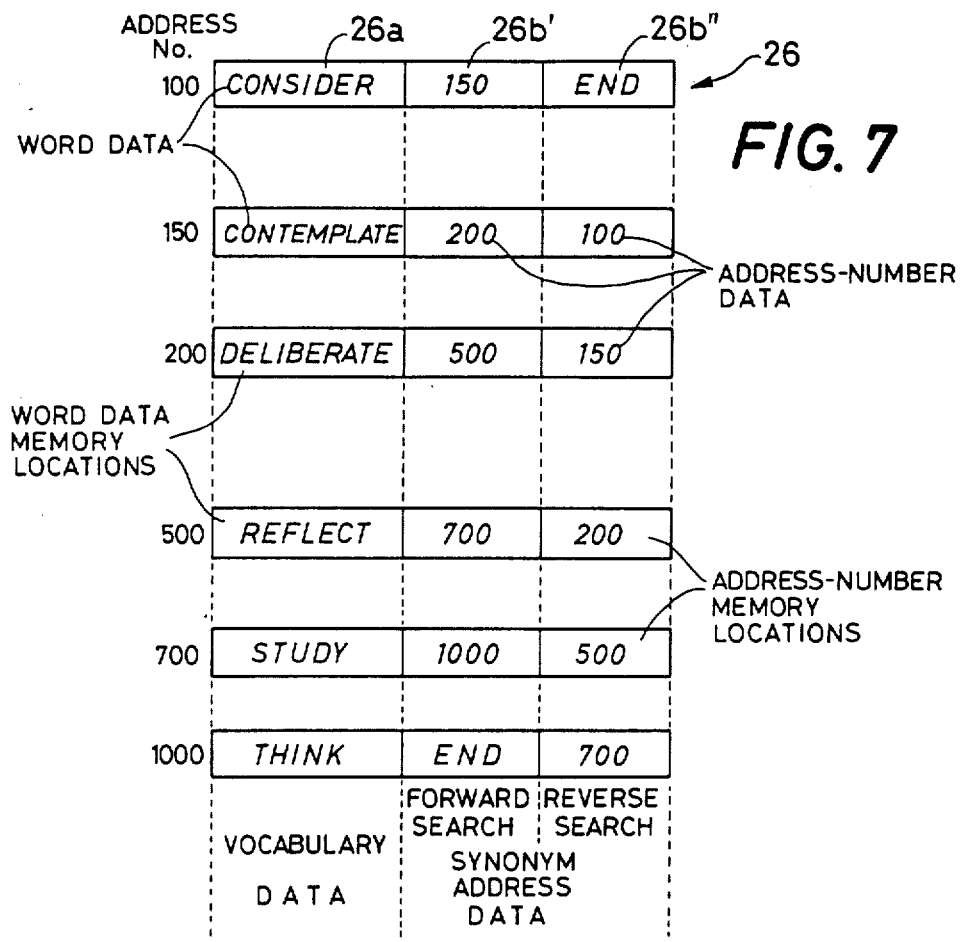
FIG. 7 is a diagrammatic illustration, corresponding to FIG. 5, showing another embodiment of the electronic dictionary of the invention.
Figure 8:
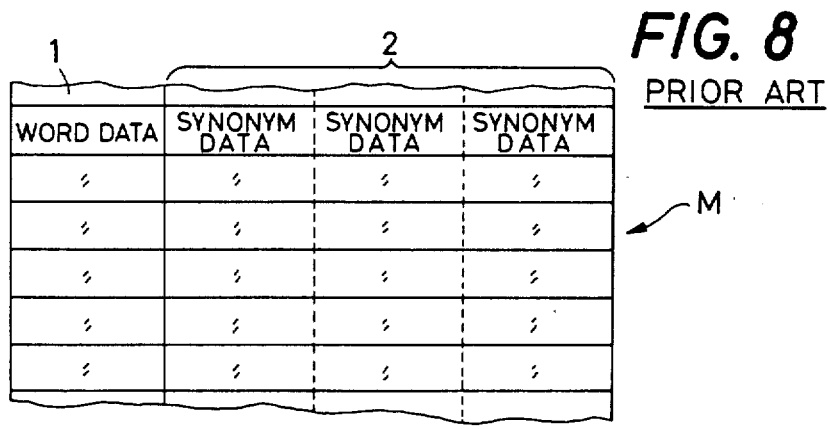
FIG. 8 is a diagram showing data memory locations of a dictionary memory used in a known electronic dictionary.
Figure 9:
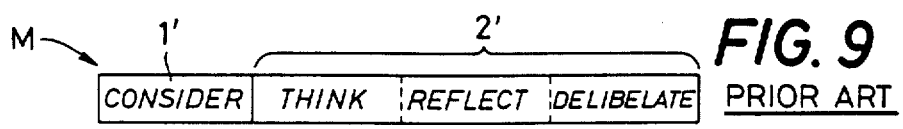
FIG. 9 is a view showing an example of contents of one of the data memory locations of the known dictionary memory of FIG. 8.

Referring next to FIG. 7, an alternative embodiment of the invention will be described.

In this embodiment, a group of synonyms of a keyed-in word are not connected together in a closed loop as in the preceding embodiment wherein the members of the synonym group are displayed in succession in only one direction along a closed loop; but are connected together in series, i.e., in an open loop, as described below.

An electronic dictionary of the alternative embodiment uses a dictionary memory in the form of a ROM 26 which comprises a multiplicity of data memory locations identified by address numbers as in the first embodiment. However, each of the data memory location comprises: a word-data memory location 26a storing a set of word data; a first address-number memory location 26b'; and a second address-number memory location 26b''. The word-data memory locations 26a of the multiple data memory locations constitute a vocabulary storage section, and the first and second address-number memory locations constitute a synonym-address storage section. As in the first embodiment, multiple synonym groups of words are defined by word data stored in the vocabulary section. Member words of a given synonym group are searched and retrieved with address-number data stored in the first and second address-number memory locations 26b' and 26b''. This aspect will be explained referring to an example of FIG. 7 wherein the same words as illustrated in FIG. 5 constitute a synonym group, and the member words of the group are stored in the same addresses as in FIG. 5.

In each of the first address-number memory locations 26b', there is stored only one set of address-number data so that the member words of the synonym group may be searched in a forward direction (in one direction) with the address-number data stored in the first address-number memory locations 26b'. More particularly, address-number data "150", "200", "500", "700" and "1000" are stored in the first address-number memory locations 26b' at address Nos. 100, 150, 200, 500, and 700, respectively. However, a forward end data "END" is stored in the first address-number memory location 26b' at address No. 1000. This forward end data "END" represents an end of search in the forward direction. On the other hand, each of the second address-number memory locations 26b'' stores only one set of desired address-number data so that the member words may be searched in a backward or reverse direction (in another direction opposite to the said one direction) with the address-number data stored in the second address-number memory locations 26b''. In this example, address-number data "700", "500", "200", "150" and "100" are stored in the second address-number memory locations 26b'' at address Nos. 100, 700, 500, 200 and 150, respectively. However, a backward end data "END" is stored in the second address-number memory location 26b" at address No. 100. This backward end data "END" represents an end of search in the backward direction.

If the word "CONSIDER" is keyed in, its synonyms "COMTEMPLATE", "DELIBERATE", "REFLECT", "STUDY" and "THINK" are retrieved (and displayed) in this order, upon repeated operations of the synonym-call key 16, according to the address-number data "150", "200", "500", "700" and "1000" stored in the first address-number memory locations 26b' at address Nos. 100, 150, 200, 500 and 700, respectively. Thus, the CPU 23 is designed to search the address-number data in the first address-number memory locations 26b' before searching the address-number data in the second address-number memory locations 26b".

When the CPU 23 has retrieved the forward end data "END" stored in the first address-number memory location 26b' at address No. 1000, the CPU 23 then retrieves the address-number data "700" stored in the second address-number memroy location 26b" at the same address (address No. 1000). This triggers a search in the backward direction, whereby the words "STUDY", "REFLECT", "DELIBERATE", "COMTEMPLATE"and "CONSIDER" are retrieved (and displayed) in this order upon repeated activation of the synonym-call key 16, according to the address-number data "700", "500", "200", "150" and "100" stored in the second address-number memory locations 26b" at address Nos. 1000, 700, 500, 200 and 150, respectively. When the CPU 23 has retrieved the backward end data "END" stored in the second address-number memory location 26b" at address No. 100, the CPU 23 then directs the display 18 to provide a message that no more members of the synonym group involved are present in the dictionary.

In the above example, the synonyms of the keyed-in word "CONSIDER" are displayed twice by repeated depression of the synonym-call key 16, until the word "CONSIDER" is displayed as a synonym of the keyed-in word "CONSIDER".

In the case where the operator keys in a word "STUDY", the synonyms of that synonym group will be displayed in the order of "THINK", "STUDY", "REFLECT", "DELIBERATE", "COMTEMPLATE" and "CONSIDER". In this case, the word "STUDY" is displayed as a second synonym of the keyed-in word "STUDY". If the operator keys in a word "THINK", its synonyms are displayed in the order of "STUDY", "REFLECT", "DELIBERATE", "COMTEMPLATE" and "CONSIDER". In this case, none of the member words of the group are displayed twice.

In the open loop arrangement of this alternative embodiment, the member words of a synonym group are searched and retrieved in two opposite directions in most cases, and the mode of indication of the synonyms depends upon the specific word of the synonym group which is keyed in through the character keys 14.

While the address-number data in the first address-number memory locations 26b', for example, are selected so that the address numbers represented by these address-number data are increased in the forward direction as the address numbers of the corresponding data memory locations are increased, it is possible that those address-number data be selected as desired provided all member words of a synonym group may be searched in one direction with the address-number data in the first address-number memory locations 26b', and in the opposite direction with the address-number data in the second address-number memory location 26b".

As previously described as an example of operation of the embodiment of FIG. 7, when the word "STUDY" is keyed in, the word "STUDY" is displayed as a second synonym of the keyed-in word "STUDY", because the CPU 23 retrieves the address-number data "700" in the second address-number memory location 26b" at address No. 1000 at which the forward end data "END" is stored in the corresponding first address-number memory location 26b'. However, it is possible that this step of displaying the keyed-in word as a synonym thereof may be eliminated, because the display of the keyed-in word as a synonym thereof has little significance. This elimination may be accomplished, for example, in the following manner. Assuming the word "STUDY" is keyed in through the character keys 14, the CPU 23 stores in the RAM 25 the address-number data "500" in the second address-number memory location 26b" at address No. 700. When the first synonym "THINK" of the keyed-in word "STUDY" has been displayed, and the forward end data "END" in the first address-number memory location 26b' at address No. 1000 has been retrieved, the CPU retrieves the address-number data "500" which was stored in the RAM 25 when the word "STUDY" was keyed in. Therefore, the word "REFLECT" stored in the data memory location at address No. 500 is displayed as a second synonym of the word "STUDY". Thereafter, the words "DELIBERATE", "CONTEMPLATE" and "CONSIDER" are displayed in this order according to the address-number data in the second address-number memory locations 26b" at address Nos. 500, 200 and 150. That is, when the forward end data "END" is retrieved, the CPU 23 retrieves the address-number data which is stored in the second-address memory location 26b" at the address number associated with a keyed-in word, and which was stored in the RAM 25 when the word was keyed in. With this arrangement, the synonyms which have been displayed as a result of the forward search according to the address-number data in the first address-number memory locations 26b', will not be displayed as a result of the backward search according to the address-number data in the second address-number memory locations 26b". For example, when the word "REFLECT" is keyed in, its synonyms "STUDY" and "THINK" are displayed in this order as a result of the forward search, but these synonyms are not displayed again in the reverse order as a result of the backward search.

While the present invention has been described in its preferred embodiments, it is to be understood that the invention is not limited thereto, but may be otherwise embodied.

For example, contrary to the arrangements of the preceding embodiments wherein the member words of a synonym group are displayed one after another upon repeated operations of the synonym-call key 16, it is possible to arrange the CPU 23 such that upon a single operation of the synonym-call key 16, all address-number data associated with member words of a synonym group are retrieved and stored in a working memory, and the member words represented by word data designated by the retrieved address-number data are displayed simultaneously on suitable display means.

Although the present invention which has been described hitherto is embodied to find synonyms of a keyed-in word, it is possible that the address-number data to be stored in each of the address-number memory locations 24b, 26b', 26b" represent address numbers of word-data memory locations which stores word-data representative of an antonym of the word stored in the word-data memory location corresponding to said each address-number memory location.

Further, the invention may be embodied as electronic English-Japanese, English-German, German-French or other dictionaries wherein the vocabulary storage section is divided into two parts corresponding to two languages. In this embodiment, word data for a list of words of one language are stored in one part of the vocabulary storage section, and word data for words of the other language are stored in the other part of the vocabulary storage section. The address-number data in each address-number memory location corresponding to a word of one language represents address number of a word-data memory location which stores word-data representing a word or words of the other language which express the meaning of the word of said one language. However, it is to be understood that the words of the two languages are not necessarily converted in meaning or translated in two ways. For example, data memory locations from address No. 0001 to 1000 store word data representative of English words, and further store address-number data representative of address Nos. 1001 through 2000 at which word data for Japanese words are stored. However, data memory locations Nos. 1001 through 2000 do not store address-number data representative of address Nos. 0001 through 1000 for the English words. In this case, the dictionary may be used only as an English-Japanese dictionary, and not as a Japanese-English dictionary.

It will be obvious that other changes and modifications of the invention may occur to those skilled in the art without departing from the spirit and scope of the invention defined in the appended claims.

What is claimed is:

1. An electronic dictionary to retrieve and display word data related to a word input into the dictionary comprising
    an input means to insert the letters of a word into the electronic dictionary to retrieve related word data including
        a plurality of character keys to insert character data representing a word,
        and a call key means to signal proceeding to a next designated word;
    a vocabulary storage section having a plurality of word data items;
    related groups of word data items in said vocabulary storage section with each of said related groups of word data items forming a closed loop beginning and ending with the character data;
    a word data memory location in said vocabulary storage section for storing each of said word data items;
    an identifying address appendixed to each of said word data items and included in said closed loop of that related group;
    address number datam also appendixed to each of said word data items and also included in said closed loop of that related group;
    an address number memory location for storing each of said address number datam;
    a working memory means for storing character data entered through said character keys;
    search means for searching, upon activation of said call key means, said word data memory locations having said word data item represented by said character data entered by said character keys;
    first retrieval means for retrieving said address number datum stored in said address number memory location corresponding to said word data memory location of said word data item to which said address number datum is appendixed and corresponding to said word data memory location searched by said search means;
    second retrieval means for retrieving said word data item stored in said word data memory location designated by said identifying address corresponding to said address number datum retrieved by said first retrieval means;
    display means for indicating said word data item retrieved by said second retrieval means as related to said character data;
    said first retrieval means operating upon each signal from call key means to retrieve said address number datum stored in said address number memory location corresponding to said word data memory location of said word data item to which said address number datum is apppendixed and corresponding to said word data item last retrieved by said second retrieval means;
    said second retrieval means, upon each operation of said first retrieval means, retrieving said word data item stored in said word data memory location designated by said identifying address corresponding to said address number datum retrieved by said first retrieval means;
    said first and second retrieval means operating in a closed loop of one of each of said related groups of word data items determined by said character data entered by said character keys; and
    means to exit from the closed hoop with clearing of the display means.

2. The electronic dictionary of claim 1 wherein
said display means indicates said word represented by said character data entered through said character keys together with said word data item from said related group of word data items.

3. The electronic dictionary of claim 2 wherein
said word and said word data item are synonyms.

4. The electronic dictionary of claim 1 wherein
if said search means fails to find, upon activation of said call key means, in any of said word data memory locations, said word represented by said character data in said working memory means, said display means provides an indication that said word represented by said character data is not present in said vocabulary storage section.

5. The electronic dictionary of claim 1 wherein
upon each activation of said call key means, said display means clears one of said word data items of said related group of word data items and indicates another of said word data items of said same related group thereby indicating said word data items of said related group of word data items one after another.

6. The electronic dictionary of claim 5 wherein
said working memory means stores the word data item stored in said word data memory location designated by said address number datum which is retrieved by said first retrieval means upon each activation of said call key means, and concurrently stores said address number data stored in said address number memory location corresponding to said word data item which is concurrently stored in said working memory means, said word data item and said address number data concurrently stored in said working memory means being cleared when the next said address number data is retrieved upon the next activation of said call key means.

7. The electronic dictionary of claim 1 wherein
said address number datum in each of said address number memory locations associated with each of said related group of word data items represents one of said identifying addresses at which is stored a word synonymous with the word data item stored in the word data memory location corresponding to each said address number memory location.

8. The electronic dictionary of claim 1 wherein
said input means includes
a clear key which upon activation clears said character data stored in said working memory means an indication on said display means.

9. The electronic dictionary of claim 1 further including
a printing device;
said input means further including
a space bar which upon activation causes said printing device to print said word data item indicated on said display means or said character data entered through said character keys when said word data item is not indicated on said display means upon activation of said space bar.

10. An electronic dictionary to retrieve and display word data related to a word input into the dictionary comprising
an input means to insert the letters of a word into the electronic dictionary to retrieve related word data including
a plurality of character keys to insert character data representing a word,
and a call key means to signal proceeding to a next designated word;
a vocabulary storage section having a plurality of word data items;
related groups of word data items in said vocabulary storage section with each of said related groups of word data items forming a closed loop of related words including the character data;
a word data memory location in said vocabulary storage section for storing each of said word data items;
an identifying address appendixed to each of said word data items;
first and second address number data also appendixed to each of said word data items;
an address number memory location for storing each of said address number datam;
a working memory means for storing character data entered through said character keys;
search means for searching, upon activation of said call key means, said word data memory locations having said word data items represented by said character data entered by said character keys;
first retrieval means for retrieving said first and second address number data stored in said address number memory location corresponding to said word data memory location of said word data item to which said address number data is appendixed and corresponding to said word data memory location searched by said search means;

second retrieval means for retrieving said word data item stored in said word data memory location designated by said identifying address corresponding to said address number data retrieved by said first retrieval means;
display means for indicating said word data item retrieved by said second retrieval means as related to said character data;
said first retrieval means operating upon each signal from said call key means to retrieve said address number data stored in said address number memory location corresponding to said word data memory location of said word data item to which said address number data is appendixed and corresponding to said word data item last retrieved by said second retrieval means;
said second retrieval means, upon each operation of said first retrieval means, retrieving said word data item stored in said word data memory location designated by said identifying address corresponding to said address number datum retrieved by said first retrieval means;
said first and second retrieval means operating in a loop of one of each of said related groups of word data items determined by said character data entered by said character keys;
each of said related groups of word data items having one word data item with an end of search direction signal as a first address number datum and another word data item with an end of search direction signal as a second address number datum with searching made in an opposite direction after reaching said end of search direction signal as a first address number datum; and
means to exit from the loop of a related group with the two end of serach direction signals with clearing of the display means.

11. The electronic dictionary of claim 10 wherein
said related groups of word data items consist of word data items synonymous with at least one of said word data items in said group.

12. The electronic dictionary of claim 10 wherein
said first retrieval means retrieves said end of search direction signal as a first address number datum for one of said word data items, said first retrieval means then retrieves said second address number datum of that said word data item and searches in the opposite direction.

13. The electronic dictionary of claim 10 wherein
said display means provides an indication that no more word data items of said one related group of word data items are present in the vocabulary storage section upon said first retrieval means retrieving said end of search direction signal as a second address number address.

14. The electronic dictionary of claim 10 wherein
upon a first activation of said call key means after entry of a word through said character keys, said working memory means stores said address number datum in the second address number memory location which corresponds to said word data memory location searched by said search means;
upon said first retrieval means retrieving said end of search direction signal as a first address number datum for one of said word data items searching in one direction, said first retrieval means retrieves said address number datum which has been stored in said working memory means upon first activation of said call key means.

* * * * *